United States Patent
Motgi et al.

(10) Patent No.: US 12,536,182 B2
(45) Date of Patent: Jan. 27, 2026

(54) SYSTEM AND METHOD FOR MANAGING DATA BY PROCESSING SEARCH QUERIES

(71) Applicant: Dell Products L.P., Round Rock, TX (US)

(72) Inventors: Prem Pradeep Motgi, Austin, TX (US); Dharmesh M. Patel, Round Rock, TX (US); Manpreet Singh Sokhi, Santa Clara, CA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/458,401

(22) Filed: Aug. 30, 2023

(65) Prior Publication Data

US 2025/0077531 A1    Mar. 6, 2025

(51) Int. Cl.
*G06F 16/2457* (2019.01)

(52) U.S. Cl.
CPC .............................. *G06F 16/24578* (2019.01)

(58) Field of Classification Search
None
See application file for complete search history.

(56) References Cited

U.S. PATENT DOCUMENTS

| | | |
|---|---|---|
| 5,649,060 A | 7/1997 | Ellozy et al. |
| 5,821,871 A | 10/1998 | Benzler |
| 6,606,620 B1 | 8/2003 | Sundaresan |
| 6,721,713 B1 | 4/2004 | Guheen |
| 7,315,826 B1 | 1/2008 | Guheen |
| 8,117,235 B1 | 2/2012 | Barta |
| 8,255,386 B1 | 8/2012 | Annau et al. |
| 8,255,948 B1 | 8/2012 | Black et al. |
| 8,335,688 B2 | 12/2012 | Yegnanarayanan et al. |
| 8,412,521 B2 | 4/2013 | Mathias et al. |

(Continued)

FOREIGN PATENT DOCUMENTS

| | | |
|---|---|---|
| CN | 202058147 U | 11/2011 |
| CN | 115292285 A | 11/2022 |

(Continued)

OTHER PUBLICATIONS

Balaskas, Georgios, et al., "An end-to-end system for transcription, translation, and summarization to support the co-creation process. A Health CASCADE Study", ACM PETRA '23, published Aug. 10, 2023, pp. 625-631. (Year: 2023) (7 Pages).

(Continued)

*Primary Examiner* — Yu Zhao
(74) *Attorney, Agent, or Firm* — WOMBLE BOND DICKINSON (US) LLP

(57) ABSTRACT

Methods and systems for managing data stored in a data management system by processing search queries are disclosed. To manage data, data management system may classify the data based on relevancy of the data for one or more purposes with respect to an individual. To identify relevant data, data management system may analyze data, including audio recordings of interactions between the individual for which the data is regarding and other individuals that provide services to the individual and identify topics of the data. Based on the analysis of the data and identified topics, data management system may establish a ranking order of the topics that are more relevant to the individual.

20 Claims, 7 Drawing Sheets

(56) References Cited

U.S. PATENT DOCUMENTS

| | | | |
|---|---|---|---|
| 8,495,720 B2 | 7/2013 | Counterman | |
| 8,955,076 B1 | 2/2015 | Faibish | |
| 9,009,844 B1 | 4/2015 | Corn | |
| 9,031,839 B2 | 5/2015 | Thorsen et al. | |
| 9,361,428 B2 | 6/2016 | Bessette | |
| 9,571,890 B1 | 2/2017 | Diamondstein | |
| 9,749,353 B1 | 8/2017 | Benskin | |
| 9,754,209 B1 | 9/2017 | Kronrod | |
| 9,781,097 B2 | 10/2017 | Grajek et al. | |
| 10,042,993 B2 | 8/2018 | Beigi | |
| 10,073,948 B2 | 9/2018 | Cohen et al. | |
| 10,157,275 B1 | 12/2018 | Venkatasamy et al. | |
| 10,169,599 B2 | 1/2019 | Fox | |
| 10,462,142 B2 | 10/2019 | Pattar et al. | |
| 10,521,572 B2 | 12/2019 | Nygate | |
| 10,701,056 B2 | 6/2020 | Murthy | |
| 10,896,681 B2 | 1/2021 | Aleksic et al. | |
| 10,904,237 B2 | 1/2021 | Murthy et al. | |
| 10,997,315 B2 | 5/2021 | Barday | |
| 11,010,392 B1 | 5/2021 | Hirsch et al. | |
| 11,094,402 B2 | 8/2021 | Brown et al. | |
| 11,217,331 B2 | 1/2022 | Vishnubhatla et al. | |
| 11,405,189 B1 | 8/2022 | Bennison | |
| 11,533,619 B1 | 12/2022 | Kahn | |
| 11,550,842 B2 | 1/2023 | Clark | |
| 11,631,401 B1 | 4/2023 | Nudd | |
| 11,693,910 B2* | 7/2023 | Singhal | G06F 16/908 707/723 |
| 11,763,821 B1 | 9/2023 | McNair | |
| 11,849,069 B1 | 12/2023 | Can | |
| 12,118,121 B2 | 10/2024 | Brannon | |
| 12,135,708 B2 | 11/2024 | Chermside | |
| 2003/0046401 A1 | 3/2003 | Abbott | |
| 2005/0160166 A1* | 7/2005 | Kraenzel | G06F 16/93 709/224 |
| 2008/0154961 A1 | 6/2008 | Dougall | |
| 2008/0275701 A1* | 11/2008 | Wu | G06F 16/685 704/235 |
| 2009/0171692 A1 | 7/2009 | Zilberman et al. | |
| 2009/0216746 A1 | 8/2009 | Aubin | |
| 2009/0328175 A1 | 12/2009 | Shuster | |
| 2010/0121657 A1 | 5/2010 | Rosenberger | |
| 2010/0169304 A1 | 7/2010 | Hendricksen et al. | |
| 2011/0072233 A1 | 3/2011 | Dawkins | |
| 2011/0131174 A1 | 6/2011 | Birch et al. | |
| 2011/0307435 A1 | 12/2011 | Overell | |
| 2012/0265771 A1 | 10/2012 | Suh | |
| 2014/0181673 A1 | 6/2014 | Work | |
| 2014/0201199 A1 | 7/2014 | Hajaj | |
| 2014/0207885 A1 | 7/2014 | Baker et al. | |
| 2014/0344288 A1 | 11/2014 | Evans | |
| 2015/0101065 A1 | 4/2015 | Sullivan | |
| 2015/0169574 A1 | 6/2015 | Bau et al. | |
| 2015/0199268 A1 | 7/2015 | Davis et al. | |
| 2015/0244706 A1 | 8/2015 | Grajek | |
| 2015/0350210 A1 | 12/2015 | Thibadeau, Sr. | |
| 2015/0356127 A1 | 12/2015 | Pierre et al. | |
| 2016/0006839 A1 | 1/2016 | Sawazaki | |
| 2016/0062689 A1 | 3/2016 | Cherubini | |
| 2016/0087976 A1 | 3/2016 | Kaplan | |
| 2016/0164813 A1 | 6/2016 | Anderson | |
| 2016/0231928 A1 | 8/2016 | Lewis et al. | |
| 2016/0232159 A1 | 8/2016 | Parikh | |
| 2016/0306812 A1 | 10/2016 | McHenry et al. | |
| 2016/0378760 A1 | 12/2016 | Braz | |
| 2017/0013047 A1 | 1/2017 | Hubbard | |
| 2017/0018026 A1 | 1/2017 | Rigdon | |
| 2017/0161439 A1 | 6/2017 | Raduchel | |
| 2017/0262164 A1 | 9/2017 | Jain | |
| 2017/0344886 A1 | 11/2017 | Tong | |
| 2017/0365101 A1 | 12/2017 | Samec et al. | |
| 2018/0024845 A1 | 1/2018 | Card, II et al. | |
| 2018/0068108 A1 | 3/2018 | Fish | |
| 2018/0121502 A1* | 5/2018 | Prieur | G06F 16/3331 |
| 2018/0181560 A1 | 6/2018 | Qiao | |
| 2018/0189352 A1 | 7/2018 | Ghafourifar | |
| 2018/0203612 A1 | 7/2018 | Kats et al. | |
| 2018/0225345 A1 | 8/2018 | Gilder | |
| 2019/0012931 A1 | 1/2019 | Candelore | |
| 2019/0079855 A1 | 3/2019 | Dewitt | |
| 2019/0279744 A1 | 9/2019 | Howley et al. | |
| 2019/0297035 A1* | 9/2019 | Fox | H04L 51/10 |
| 2019/0325036 A1 | 10/2019 | Edge | |
| 2020/0012800 A1 | 1/2020 | Karako | |
| 2020/0042685 A1 | 2/2020 | Tussy | |
| 2020/0043479 A1* | 2/2020 | Mont-Reynaud | G06F 40/58 |
| 2020/0110882 A1* | 4/2020 | Ripolles Mateu | G06F 16/353 |
| 2020/0226216 A1 | 7/2020 | Marin et al. | |
| 2020/0258516 A1 | 8/2020 | Khaleghi | |
| 2021/0056131 A1 | 2/2021 | Ackermann et al. | |
| 2021/0065203 A1 | 3/2021 | Billigmeier et al. | |
| 2021/0256534 A1 | 8/2021 | An | |
| 2021/0390196 A1 | 12/2021 | Lavine et al. | |
| 2022/0019560 A1 | 1/2022 | Durairaj | |
| 2022/0027859 A1 | 1/2022 | Daga | |
| 2022/0078007 A1 | 3/2022 | Reddem | |
| 2022/0131717 A1 | 4/2022 | Kwatra | |
| 2022/0261152 A1 | 8/2022 | Jude et al. | |
| 2022/0284090 A1 | 9/2022 | Taylor | |
| 2022/0293087 A1 | 9/2022 | Kumar | |
| 2022/0301548 A1 | 9/2022 | Wintrode | |
| 2022/0334719 A1 | 10/2022 | Thrane | |
| 2022/0335426 A1 | 10/2022 | Rapowitz | |
| 2022/0366131 A1 | 11/2022 | Ekron | |
| 2023/0020703 A1 | 1/2023 | Padinjaruveetil | |
| 2023/0029634 A1 | 2/2023 | Teeple | |
| 2023/0058470 A1 | 2/2023 | Chandrashekar et al. | |
| 2023/0061725 A1 | 3/2023 | Khan | |
| 2023/0068099 A1 | 3/2023 | Abramenko et al. | |
| 2023/0137931 A1 | 5/2023 | Song | |
| 2023/0156085 A1 | 5/2023 | Yachiku | |
| 2023/0221911 A1 | 7/2023 | Bandameedipalli | |
| 2023/0252127 A1 | 8/2023 | Taylor | |
| 2023/0254699 A1 | 8/2023 | Chaudhary | |
| 2023/0319026 A1 | 10/2023 | Waltermann | |
| 2023/0333767 A1 | 10/2023 | MacGaffey | |
| 2023/0394127 A1 | 12/2023 | Tussy | |
| 2023/0409761 A1 | 12/2023 | Nagar | |
| 2024/0112597 A1 | 4/2024 | Kim | |
| 2024/0127923 A1 | 4/2024 | Jaime | |
| 2024/0144935 A1 | 5/2024 | Martin | |
| 2024/0248592 A1 | 7/2024 | Zerhusen | |
| 2024/0340185 A1 | 10/2024 | Cameron | |

FOREIGN PATENT DOCUMENTS

| | | |
|---|---|---|
| JP | 4808173 B2 | 11/2011 |
| JP | 2015-106406 A | 6/2015 |
| WO | 2023/220948 A1 | 11/2023 |

OTHER PUBLICATIONS

"FollowMyHealth®," Allscripts Healthcare Solutions Inc, Google Play Store, Web Page <https://play.google.com/store/apps/details?id=com.jardogs.fmhmobile&hl=en_US&gl=US> accesed on Jan. 8, 2023 (4 Pages).

Page, Sébastien, "How to move your Health data from one iPhone to another," iDB, Web Page <https://www.idownloadblog.com/2016/10/13/health-data-importer-makes-moving-your-health-data-from-one-iphone-to-another-a-breeze/> accessed on Oct. 30, 2022 (9 Pages).

"MyChart," Web Page <https://www.mychart.org/> accessed on Oct. 30, 2022 (6 Pages).

Xu, Jie et al., "Federated learning for healthcare informatics," Journal of Healthcare Informatics Research 5 (2021): 1-19. (19 Pages).

Naz, Sadaf et al., "A comprehensive review of federated learning for COVID-19 detection," International Journal of Intelligent Systems 37.3 (2022): 2371-2392. (22 Pages).

Prasser, Fabian, et al., "Efficient and effective pruning strategies for health data de-identification," BMC medical informatics and decision making 16.1 (2016): 1-14. (14 Pages).

(56) References Cited

OTHER PUBLICATIONS

"Speech Recognition," Web Accessibility Initiative. Web Page <https://www.w3.org/WAI/perspective-videos/voice/> accessed on Aug. 30, 2023 (6 Pages).

"Text Size," Web Accessibility Initiative. Web Page <https://www.w3.org/WAI/GL/low-vision-a11y-tf/wiki/Text_Size> accessed on Aug. 30, 2023 (5 Pages).

Mesko, Bertlan, "The Top 10 Health Chatbots," The Medical Futurist, Aug. 1, 2023, Web Page <https://medicalfuturist.com/top-10-health-chatbots/> accessed on Aug. 30, 2023 (11 Pages).

Longoni, Chiara et al., "AI Can Outperform Doctors. So Why Don't Patients Trust It?" Harvard Business Review, Oct. 30, 2019, Web Page <https://hbr.org/2019/10/ai-can-outperform-doctors-so-why-dont-patients-trust-it> accessed on Aug. 30, 2023 (7 Pages).

"Doctor Ai," DDXRX, Web Page <https://www.ddxrx.com/> accessed on Aug. 30, 2023 (7 Pages).

"Multi-Factor Authentication and Voice Biometrics," Voice Biometrics Group, Feb. 2021, Web Page <https://www.voicebiogroup.com/starting/multi-factor-authentication-and-voice-biometrics.html> accessed on Aug. 30, 2023 (6 Pages).

Wallace, Byron C et al. "Automatically annotating topics in transcripts of patient-provider interactions via machine learning." Medical decision making : an international journal of the Society for Medical Decision Making vol. 34,4 (2014): 503-12. doi:10.1177/0272989X13514777 (20 Pages).

"Medical Transcription Analysis with Machine Learning—Doctor/Patient Conversation Demo," Amazon Web Services, Jun. 16, 2021, Web Page <https://www.youtube.com/watch?v=f5HVIALG5g4> accessed on Aug. 30, 2023 (2 Pages).

Baxendale, Simran et al., "Performing medical transcription analysis with Amazon Transcribe Medical and Amazon Comprehend Medical," Amazon Web Services, May 8, 2020, Web Page <https://aws.amazon.com/blogs/machine-learning/performing-medical-transcription-analysis-with-amazon-transcribe-medical-and-amazon-comprehend-medical/> accessed on Aug. 30, 2023 (12 Pages).

Sullivan, Todd et al., "Speaker Identification and Geographical Region Prediction in Audio Reviews," Department of Computer Science, Stanford University, 2023 (4 Pages).

"Finding Local Destinations with Siri's Regionally Specific Language Models for Speech Recognition," Apple Machine Learning Research, Aug. 2018, Web Page <https://machinelearning.apple.com/research/regionally-specific-language-models> accessed on Aug. 30, 2023 (9 Pages).

Tyagi, Nemika et al., "Demystifying the Role of Natural Language Processing (NLP) in Smart City Applications: Background, Motivation, Recent Advances, and Future Research Directions." Wireless Personal Communications 130.2 (2023): 857-908. (52 Pages).

Alozie, Emeka, "The AI Surgeon's Assistant: How Generative AI is Revolutionizing the Operating Room," Apr. 20, 2023, Web Page <https://intuitivex.com/tpost/p7bhza9611-the-ai-surgeons-assistant-how-generative> accessed on Aug. 30, 2023 (9 Pages).

Gaitan, Michelle, "Researchers at UTSA use artificial intelligence to improve cancer treatment," University of Texas at San Antonio, Apr. 18, 2023, Web Page <https://www.utsa.edu/today/2023/04/story/researchers-use-artifical-intelligence-to-improve-cancer-treatments.html> accessed on Aug. 30, 2023 (4 Pages).

Bohr, Adam et al., "The rise of artificial intelligence in healthcare applications." Artificial Intelligence in Healthcare (2020): 25-60. doi:10.1016/B978-0-12-818438-7.00002-2 (37 Pages).

"Introducing Healthcare-Specific Large Language Models from John Snow Labs," KDnuggets, Apr. 28, 2023, Web Page <https://www.kdnuggets.com/2023/04/john-snow-introducing-healthcare-specific-large-language-models-john-snow-labs.html> accessed on Aug. 30, 2023 (7 Pages).

D. Fedasyuk and I. Lutsyk, "Tools for adaptation of a mobile application to the needs of users with cognitive impairments," 2021 IEEE 16th International Conference on Computer Sciences and Information Technologies (CSIT), LVIV, Ukraine, 2021, pp. 321-324, doi: 10.1109/CSIT52700.2021.9648702. (Year: 2021).

\* cited by examiner

SYSTEM AND METHOD FOR MANAGING DATA BY PROCESSING SEARCH QUERIES

FIELD

Embodiments disclosed herein relate generally to storage management. More particularly, embodiments disclosed herein relate to systems and methods to manage storage space in a data management system.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
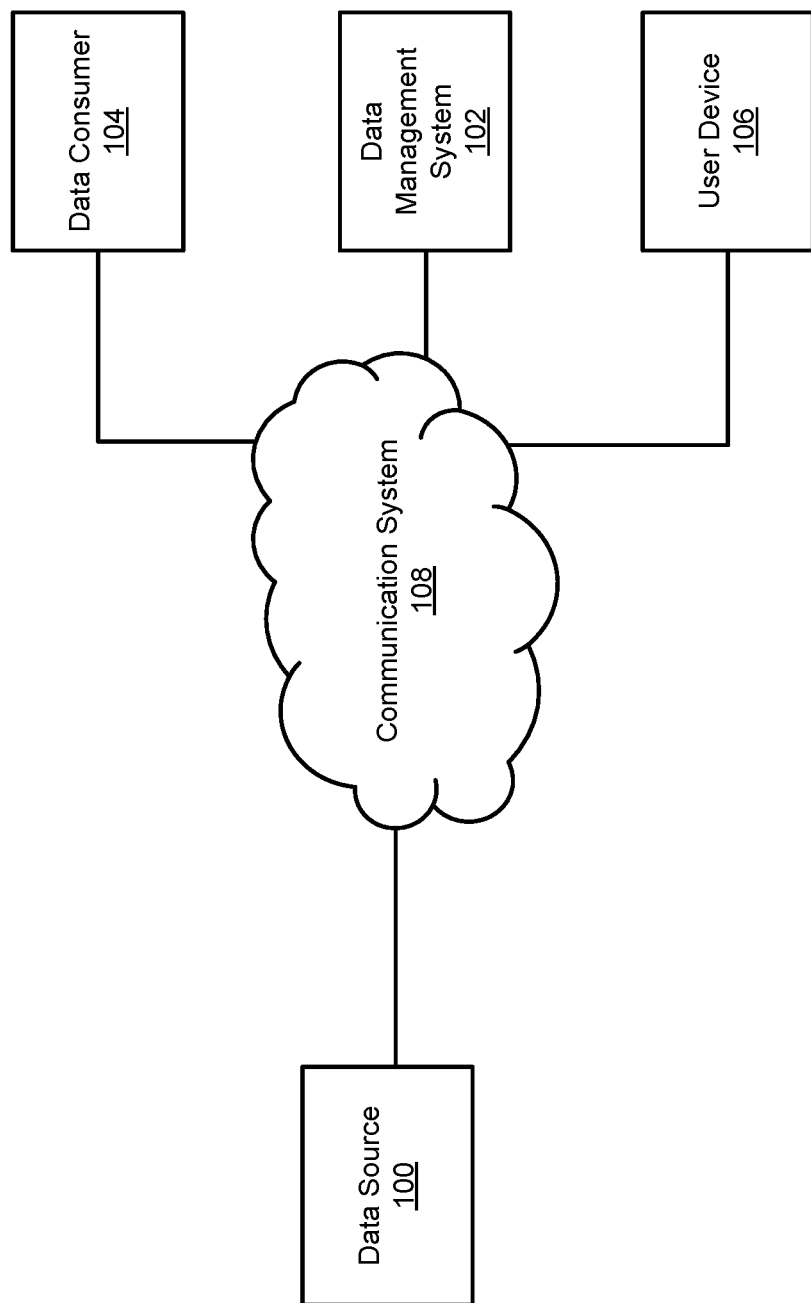
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing data stored in a data management system by processing search queries. The data may be useable, for example, by (i) an individual for which the data is regarding, and (ii) other individuals to assist the individual. For example, the data may include medical information for an individual and the data may be useable by other individuals such as healthcare providers to diagnose and/or treat the individual for various medical conditions.

Processing search queries may include obtaining a search query requesting information regarding an interest and/or performing a search process using the data to obtain a search result for the search query. The search result may include a list of portions of data identified as relevant to the interest. However, identifying portions of data relevant to the interest of the search query may be difficult, for example, if the portions of data are not identifiable based on the interest. Therefore, the search result may include portions of data that is less relevant or unhelpful for use by the requestor of the search query and/or for use by other systems which may rely on the search result to perform computer-implemented services.

To increase the likelihood that the search result will be relevant to the interest of the search query, the data management system may obtain topic classifications for the portions of data stored in the data management system prior to performing a search process using the data. Topic classifications may associate different portions of the data with different topics that are relevant to the individual for which the data is regarding. To obtain topic classifications, the data management system may analyze data being collected and stored, audio recordings of interactions between the individual and other individuals that provide services, and/or other types of data that may include information identifying relevant content to the individual for which the data is stored.

By identifying relevant content to the individual, the system may establish topics that are relevant to the individual and associate the topics to different portions of data in order to provide more accurate search results for search queries. The data management system may update the topics relevant to the individual and/or adjust relevancy rankings of the topics as new information regarding the topics is obtained. By proactively updating the relevant topics and relevancy rankings for the topics, the data management system may be more likely to identify portions of the data more relevant to interests of search queries.

Thus, embodiments disclosed herein may provide an improved searching system for managing data by processing search queries. The improved searching system may discriminate more relevant data from less relevant data based on topics relevant to different portions of data. Relevancy rankings of the topics relevant to the individual for which the data is being stored may be adjusted dynamically as new information is obtained by the system. By doing so, a system in accordance with embodiments disclosed herein may prioritize identifying portions of data in response to search queries based on the relevancy of the portions of data with respect to the interests of the search queries.

In an embodiment, a method for managing data stored in a data management system by processing search queries is disclosed. The method may include obtaining a search query from a requestor, the search query indicating a request for information regarding an interest of the requestor; performing a search process using the data, topic classifications for the data, topic rankings for the topic classifications, to obtain a search result for the interest, and the topic classifications associate different portions of the data with different topics that are based on at least one conversation between two people; and using the search result to service the search query.

The search result may indicate an ordering of relevancy of portions of the data with respect to the interest.

The search result may include a list at least a portion of the portions of the data and a rank ordering of elements of the list, the rank ordering may define the relevancy of the portions of the data with respect to the interest.

The topic rankings may be based at least in part on an audio transcript, the audio transcript may be based on an audio file, the audio file may include audio data based on at least one conversation between two people.

The two people may include a first person for which the data is stored by the data management system, and a second person which provides at least one service to the first person.

The at least one service may be a medical service, and the at least one conversation may be part of the at least one service.

The topic rankings may be based at least in part on instances of topics discussed during the at least one conversation between the two people.

The topic rankings may specify a rank ordering of the topic classifications.

The topic classifications may be based at least in part on the topics discussed during the at least one conversation between the two people.

The topic classifications may include an enumeration of each unique topic of the topics discussed during the at least one conversation between the two people.

The topic classifications may be related to a service provided by one of the two people, and exclude topics unrelated to the service provided by the one of the two people.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the computer-implemented method when the computer instructions are executed by the processor.

Turning to FIG. 1, a block diagram illustrating a system in accordance with an embodiment is shown. The system shown in FIG. 1 may provide computer-implemented services. The computer-implemented services may include data management services, data storage services, data access and control services, database services, and/or any other type of service that may be implemented with a computing device.

The system may include data management system 102. Data management system 102 may provide all, or a portion, of the computer-implemented services. To provide the computer-implemented services, data may be stored in data management system 102. The data stored in data management system 102 may include data usable (i) by an individual for which the data is stored, (ii) by other individuals to assist the individual, and/or (iii) by other individuals for other types of use. For example, the data may include healthcare information for an individual and the data may be usable by other individuals such as healthcare providers to diagnose and/or treat the individual for various health conditions.

The data stored in data management system 102 may be collected from data source 100. While illustrated with respect to a single data source, the system of FIG. 1 may include any number of data sources through which data management system 102 may obtain data. Data source 100 may include hardware and/or software components configured to obtain data, store data, provide data to other entities, and/or to perform any other task to facilitate performance of the computer-implemented services.

For example, an individual's healthcare information may be obtained from a healthcare provider system (e.g., data source 100) for use by the individual and/or other individuals (via associated devices). The data collected from data source 100 may include any quantity, size, and type of data. The data may include, for example, an audio recording (e.g., audio file) of a conversation between an individual and a healthcare provider, digitized results of medical tests, etc.

By storing data in data management system 102, the aggregated data may be usable for a variety of purposes. For example, in the healthcare context, the data may be usable for diagnostic purposes, verification purposes (e.g., second opinions), to facilitate studies by third parties that may use the data, etc. While described with respect to the healthcare services context, it will be appreciated that data may be stored in data management system 102 for other purposes and/or with respect to other contexts. For example, the stored data may be relevant for other types of services, uses, etc. without departing from embodiments disclosed herein.

However, identifying portions of data stored in data management system 102 that may be relevant with respect to an interest of a requesting individual may be difficult. For example, data management system 102 may be unable or less likely to identify portions of the data relevant to an interest based on a search query provided by a requestor because metadata for the portions of data may lack context regarding, for example, how the portions of data relate to the goals or desires of a person for which the data was collected. Further, natively the portions of data may not be self-descriptive with respect to the goals or desires of the person. If data management system 102 is unable to provide a search result indicating portions of data that are relevant to the search query, the requesting individual or entity may be unable to rely on the search result and computer implemented services provided with the search result.

In general, embodiments disclosed herein may provide methods, systems, and/or devices for managing data. To manage the data, data management system 102 may utilize additional metadata such as topic classifications for portions of data in order to identify portions of the data that are more relevant to a search query (e.g., the interest of a requestor indicated by the search query).

To service search queries, data management system 102 may select the portions of the data for search result responsive to the search query on the basis of relevancy of the portions of data indicated by the additional metadata with respect to the interest of the requestor. For example, some portions of the data stored in the data management system may be more relevant or helpful for an individual and/or other individuals (e.g., service providers such as medical professional) to provide services to the individual than other portions of the data stored in the data management system. Providing irrelevant and/or less relevant data in response to a search query may be disadvantageous for the requestor by reducing the ability of the desired services to be provided using the less-relevant data managed by data management system 102. Therefore, data management system 102 may perform search processes using topic classifications for portions of the data managed by the data management system.

In order to discriminate more relevant data from less relevant data, the data management system may analyze the data being collected and stored, audio recordings of interactions between the individual and other individuals that provide services (e.g., a purpose for the data) to the individual, and/or other types of data that may include content relevant to discerning purposes (e.g., topics) that are relevant to the individual for which the data is stored. For example, data management system 102 may analyze an audio recording of a conversation between an individual and a healthcare provider to identify medical conditions impacting the individual. Based on this identification, data management system 102 may establish topics that are relevant to the individual and classify portions of data into the topics. To service search queries, these classifications may be used to identify relevant portions of data responsive to the search queries. The relevancy may be establish using a search algorithm which may take into account, in addition to other factors, the topic classifications for portions of the data.

As new information regarding the topics becomes available, the topics and relevancy ratings (e.g., some topics may be of higher relevancy) for the topics may be updated. Consequently, the topics may be dynamically updated over time. The search algorithm may also take into account the relevancy rankings for the topics, thereby causing, in some cases, portions of data that are classified into higher relevancy topics to be preferentially selected for inclusion in search results over other portions of data that are classified into lower relevancy topics.

By dynamically updating the topics and relevancy rankings for the topics over time, embodiments disclosed herein may provide a searching system that is more likely to identify data that is more relevant to the interest of a search query and better aligned with goals or objective of a person for which the data is collected by the data storage systems. The disclosed embodiments may do so in an automated and/or semiautomated fashion thereby reducing a cognitive burden on an individual to discriminate more desirable portions of data over less desirable portions of data in response to a search query.

To provide the above noted functionality, the system of FIG. 1 may include data source 100, data management system 102, data consumer 104, user device 106, and communication system 108. Each of these components is discussed below.

Figure 2A:
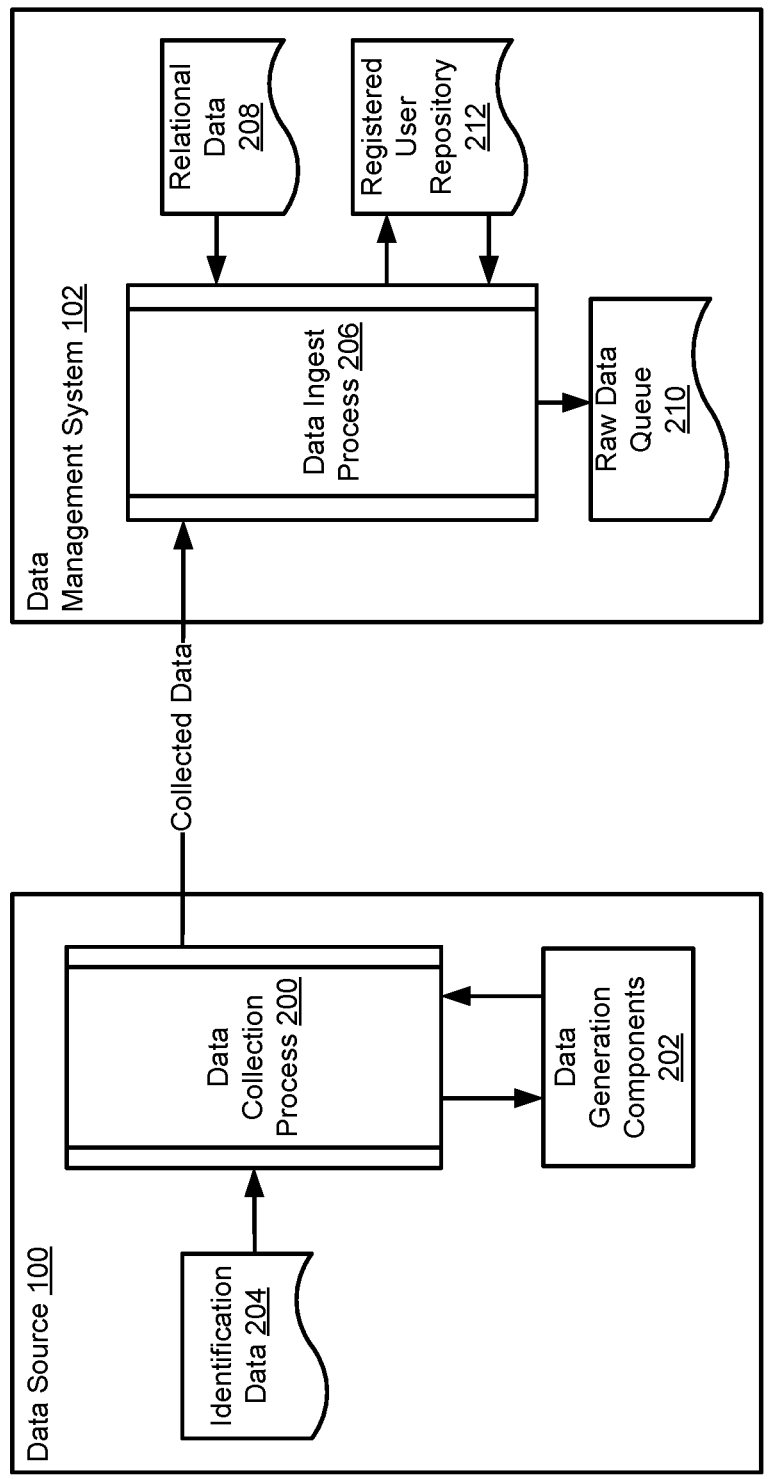
FIGS. 2A-2D show diagrams illustrating data flows in accordance with an embodiment.

Data source 100 may (i) facilitate collection and transmission of data (e.g., regarding and/or relating to an individual) to data management system 102, (ii) provide information identifying the individual or entity sourcing the data to data management system 102, and/or (iii) otherwise facilitate collection of data by data management system 102. Data source 100 may be include a system operated by a medical provider which may collect, store, and/or provide access to data for a patient or individual, a personal device that collects information about an individual (e.g., cellphone, smart watch, etc.), and/or another type of data collection device. While described with respect to a medical provider, it will be appreciated that data source 100 may provide data related to other purposes without departing from embodiments disclosed herein. Refer to FIG. 2A for additional details regarding obtaining data using data source 100.

Data source 100 may be managed by (i) an individual or a patient for which the data is being collected, (ii) professional individuals that may provide a service for an individual, and/or (iii) other individuals or entities that may provide services for an individual. For example, data source 100 may be implemented using a professional medical device and/or another device operated by a medical provider.

To manage storage of collected data, data management system 102 may (i) obtain data from data source 100, (ii) for audio data, perform a transcription process to obtain a text transcript of the audio data, (iii) perform an analysis of the text transcript of the data, (iv) based on the analysis of the text transcript, identify topic classifications and topic rankings for the topic classifications, (v) when new data is obtained, perform a topic identification process to identify a topic classification for the new data, (vi) selectively store or reject the new data for storage (e.g., depending on the topic classification and other factors) with an identifier based on the result of the topic identification process, (vii) perform storage space management actions (e.g., based on topic classifications for stored data, topic rankings, and/or other factors) to manage storage space of data management system 102, and (viii) service search queries using topic and topic relevancy related metadata ascribed to different portions of data. Refer to FIGS. 2A-2D for additional details regarding storing data and servicing search queries.

To manage storage space, data management system 102 may perform any number of storage space management actions, which may include (i) identifying when storage space is unavailable (and/or meets other criteria), (ii) identifying portion(s) of data to delete and/or portions of not yet stored data to discard without storing, and/or (iii) deleting the identified portion(s) of data. Similarly, data management system 102 may also provide access to stored data (e.g., to the individual for which the data is being managed and/or to data consumer 104). When providing the stored data, the data management system may utilize a search algorithm that integrates topic and topic relevancy related metadata to rank portions of data with respect to relevancy for search queries.

Data consumer 104 may (i) obtain limited access to selective portions of data stored in data management system 102, (ii) submit requests for access to data stored in data management system 102 by a third party or other individual, (iii) provide information identifying the individual or entity requesting access to the data and/or other types of information upon which decisions to grant access may be based, and/or (iv) once a request for access is granted (e.g., by user device 106), obtain access to data stored in data management system 102 (e.g., data for which access has been granted based on the submitted requests).

User device 106 may facilitate (i) access and control over data stored in data management system 102 by an individual, (ii) designation of portions of data for use by other individuals (e.g., data consumer 104), and/or (iii) performance of other management operations. User device 106 may be registered with data management system 102. For example, data management system 102 may confirm the identity of user device 106 based on a registration of the device, the registration may indicate that user device 106 is being used by the user or individual.

Figure 3:
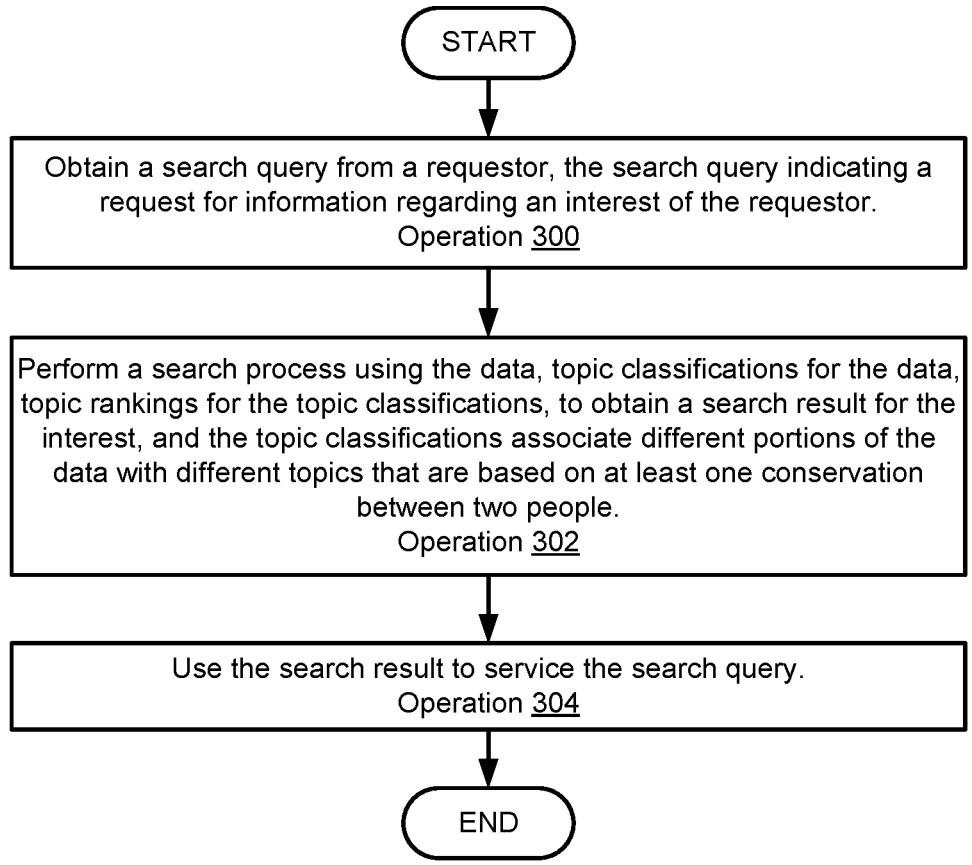
FIG. 3 shows a flow diagram illustrating methods of managing data stored in a data management system by processing search queries in accordance with an embodiment.

When providing their functionality, any of data source 100, data management system 102, data consumer 104, and/or user device 106 may perform all, or a portion, of the method shown in FIG. 3.

Any of (and/or components thereof) data source 100, data management system 102, data consumer 104, and user device 106 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIG. 1 may be operably connected to each other (and/or components not illustrated) with communication system 108. In an embodiment, communication system 108 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as including a limited number of specific components, a system in accordance with an embodiment may include fewer, additional, and/or different components than those illustrated therein.

To further clarify embodiments disclosed herein, diagrams illustrating data flows implemented by a system over time in accordance with an embodiment are shown in FIGS. 2A-2D. In FIGS. 2A-2D, a first set of shapes (e.g., 204, 208) is used to represent data structures, a second set of shapes (e.g., 200, 206) is used to represent processes performed using data, and a third set of shapes (e.g., 226) is used to represent large scale data structures such as databases.

Turning to FIG. 2A, a first data flow diagram illustrating data flows, data processing, and/or other operations that may be performed by the system of FIG. 1 in accordance with an embodiment is shown. The data flows, data processing, and/or other operations may be performed when data is obtained from a data source. In FIG. 2A, example flows between data source 100 and data management system 102 are shown. It will be appreciated that similar data flow with respect to any devices (e.g., devices that may collect and transmit data to data management system 102 such as user device 106) and data management system 102 may be present.

To provide computer-implemented services, data management system 102 may obtain, store, and/or otherwise manage data for an individual. Data management system 102 may (i) obtain data from data source 100, and (ii) store some or all of the collected data for future use. However, data management system 102 may have a limited capacity for storing data. Consequently, data management system 102 may perform various storage space management processes over time, as discussed in greater detail with respect to FIGS. 2B-2D.

To obtain the data, data management system 102 and data sources 100 may cooperate with one another for data collection purposes.

To cooperate with data management system 102 for data collection purposes, data source 100 may perform data collection process 200. During data collection process 200, data may be (i) collected using data generation components 202, and (ii) provided all or a portion of the collected data (and/or derived data that is based at least in part on the collected data) to data management system 102.

Data generation components 202 may include software components and/or hardware components to collect data. For example, data generation components 202 may include sensors, generative components, and display components of data source 100. The display components may be used to display prompts to a user of data source 100 (e.g., to instruct a user how to participate in data collection processes). The generative components may be used to generate various stimulations (e.g., optical, audio, etc.) for the user (e.g., so that data may be collected). The sensors may be used to obtain information regarding the user and the impact of the stimulations on the user.

Once collected, the data may be prepared for transmission to data management system. To prepare the collected data for transmission, the data may be enriched with additional information by adding metadata. The metadata may include, for example, (i) information regarding how the data was collected, (ii) information regarding for which entity the data was collected such as a user for which data management system 102 manages data, (iii) collection time, and/or other information that may enhance the collected data.

To add the metadata, data source 100 may store information regarding the user. For example, data source 100 may store identification data 204. Identification data 204 may include information regarding the identity of the individual for which the collected data is regarding/relating to. For example, identifying information such as the individual's name, date of birth, and/or any other identifying information for the individual for which the data is regarding.

Identification data 204 may also include information regarding the identity of the user and/or entity operating data source 100. For example, identifying information such as the user's and/or entity's name, IP address, and/or any other information useful to identify the operator and/or manager of data source 100.

Once enhanced, the collected data and corresponding metadata may be provided to data management system 102.

Figure 2B:
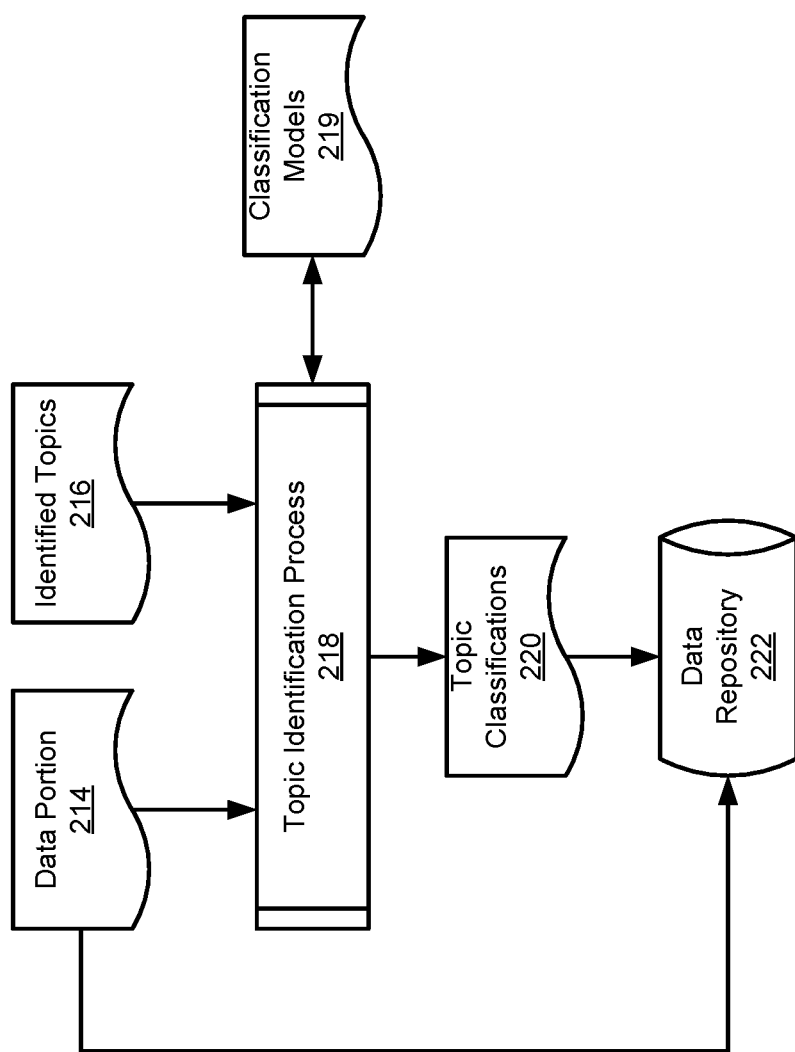
Figure 2C:
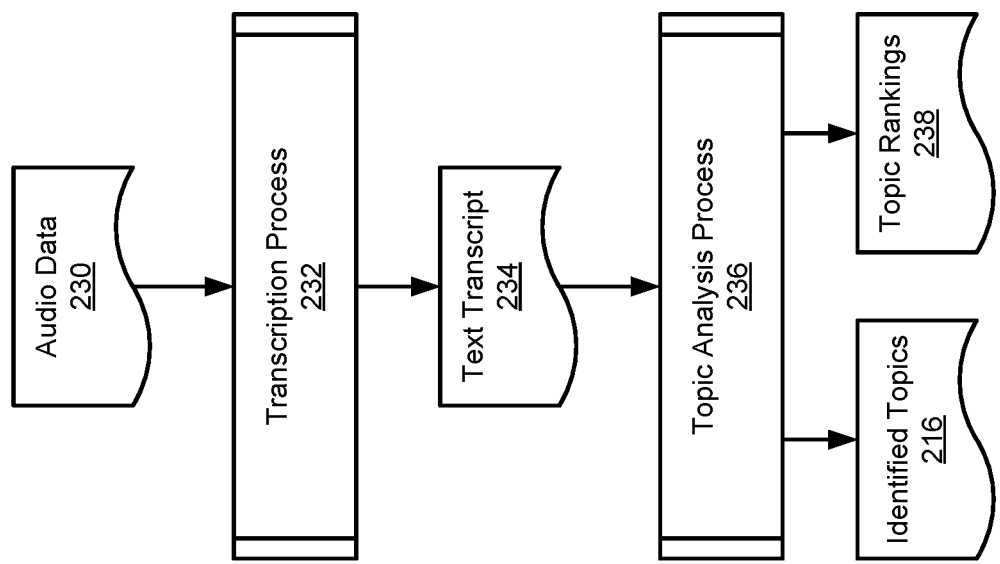
Figure 2D:
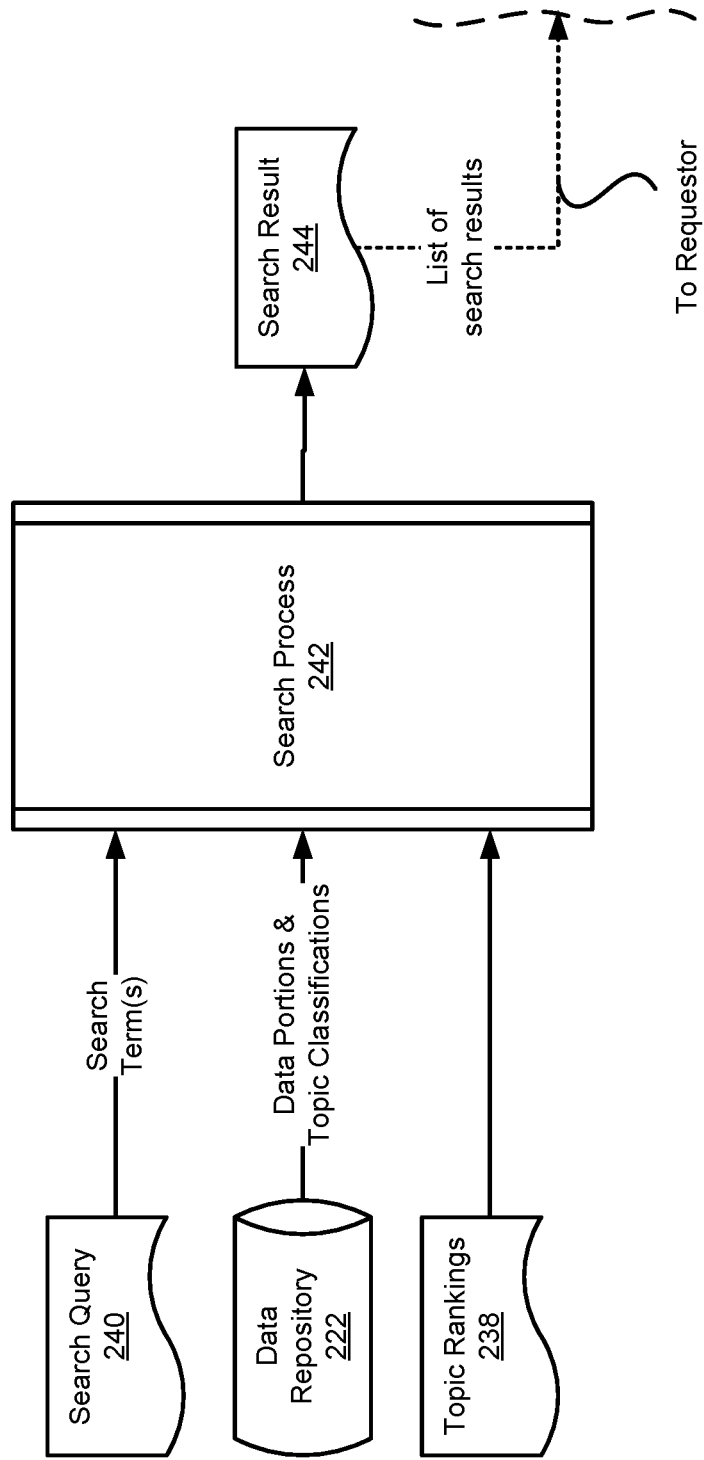

To cooperate with data source 100 for data collection purposes, data management system 102 may perform data ingest process 206. During data ingest process 206, the collected data obtained from data source 100 may be (i) classified with respect to which user the collected data is associated, (ii) managed in accordance with user-based access controls, and (iii) queued in raw data queue 210 for additional processing. Refer to FIGS. 2B-2D for additional details regarding the additional processing that may be performed on collected data.

To classify the data with respect to a user, the metadata may specify the user for which the data was collected. The user specified by the metadata may checked against users listed in registered user repository 212. Registered user repository 212 may include information regarding users that received data management services from data management system 102. Thus, when collected data is obtained, it may be verified as being relevant to users using registered user repository 212 (if not relevant, it may be discarded).

To manage the collected data in accordance with access controls, access to the data may be at least partially restricted. The restrictions for access to the collected data may be specified by relational data 208. Relational data 208 may specify restrictions on access to data managed by data management system 102 on behalf of different users. For example, the users may specify limits on the ability of other entities to access data managed by data management system 102 on behalf of the users.

For example, relational data 208 may specify whether and to what extent a data consumer (e.g., 104) may access the data stored by data management system 102 on behalf of a user. The access controls may be granular, thereby allowing a user to control which data consumers are able to access different portions of data. The access controls for a user may be established on a topic by topic basis. Thus, access to data for a given consumer may be given on a topic basis thereby allowing a user to provide a data consumer with access to all, or a portion, of the data managed by data management system 102 that is related to one or more topics. Refer to FIGS. 2B-2D for additional information regarding topics.

To prepare the collected data for additional processing, the collected data may be queued in raw data queue 210. Raw data queue 210 may be implemented as a first in first out queue, or other type of queue. Raw data queue 210 may buffer data until it is processed and stored for long term retention.

Turning to FIG. 2B, a second data flow diagram illustrating data flows, data processing, and/or other operations that may be performed by the system of FIG. 1 in accordance with an embodiment is shown. The data flows, data processing, and/or other operations may be performed when data is classified with respect to its relevancy to different topics.

As discussed above, the system may manage data by processing search queries based on the relevancy of the data for one or more purposes with respect to an individual (e.g., for which the data is being collected and stored). To discriminate more relevant data from less relevant data, data management system 102 may classify the relevancy of data with respect to topics that are relevant to the individual.

To classify the collected data and/or stored data, topic identification process 218 may be performed. During topic identification process 218, portions of data (e.g., data portion 214) may be obtained from the raw data queue and/or data repository 222 (e.g., if re-classifying data). The portions of data may reflect discrete portions such as files.

Once obtained, data portion 214 may be classified with respect to certain topics that have been identified as being relevant to an individual. The topics that are relevant to the individual may be specified by identified topics 216. Refer to FIG. 2C for additional details regarding identifying topics that are relevant to different individuals.

To classify data portion 214 with respect to identified topics 216, various classification models 219 may be used. The classification models 219 may be implemented using, for example, inference models (e.g., decision trees, machine learning models, rules based systems, etc.). Classification models 219 may include any number of such inference models.

In an embodiment, at least some of the inference models are implemented by training a neural network to perform classification. The neural network may be trained using supervised learning, self-supervised learning, semi-supervised learning, and/or unsupervised learning. For example, with supervised learning, some number of instances of data may be hand-labeled by a subject matter expert or other person with respect to the topics (may be any number of topics, may include more topics than identified topics 216) for which the data is relevant to obtain a training data set. Once obtained, the training data set may be used to train the neural network (e.g., to set the weights of neurons and/or other features of the neural network).

In an embodiment, classification models 219 includes different models that are adapted to classify different types of data. For example, different inference models of classification models 219 may be adapted to handle images, text documents, tabular data sets, and/or other types of data, respectively.

In an embodiment, classification models 219 includes multiple different models that may be used to classify data portion 214. For example, data portion 214 may include different types of data. The inference models from classification models 219 may be used to identify topics for these different types of data, thereby identifying multiple topics to which data portion 214 may be relevant.

In an embodiment, at least one inference model from classification models 219 is trained to identify more than one topic for the ingested data. For example, the inference model may specify a range of different topics to which data portion 214 is relevant. The range of different topics may include a variety of topics that may be relevant to the individual and/or user for which the data is being stored in data management system 102.

To obtain topic classifications 220 for data portion 214, data portion 214 may be ingested by any of the models of classification models 219. The models may, as output, indicate any number of topics to which data portion 214 is relevant. The topics output by classification models 219 may be filtered against identified topics 216 to identify topic classifications 220. For example, if classification models 219 indicate that data portion 214 is relevant for the topics of "head", "neck", "balloons", and "tattoo", but identified topics 216 only specify the topics of "head" and "neck", then the topics "balloons" and "tattoo" may be filtered out resulting in topic classifications 220 only including the topics "head" and "neck".

Once topic classifications 220 are obtained, data portion 214 and topic classifications may be stored in data repository 222 for future use. Topic classifications 220 and data portion 214 may be associated with each other in data repository 222. Topic classifications 220 may be used, for example, to service future storage space management events (e.g., occurrence of limited storage space availability) by facilitating identification of the topics for which data portion 214 is relevant.

However, as discussed above, to identify topic classifications 220, identified topics 216 (e.g., that are relevant to a user, purpose, etc.) may need to be available.

Turning to FIG. 2C, a third data flow diagram illustrating data flows, data processing, and/or other operations that may be performed by the system of FIG. 1 in accordance with an embodiment is shown. The data flows, data processing, and/or other operations may be performed to identify topics relevant to a user, purpose, and/or another basis.

To obtain identified topics 216, data including clues and/or other information usable to identify topics that are relevant may be collected. For example, audio recordings of interactions (e.g., conversations) between an individual (e.g., a user of the data management system) and other individuals that provide services (e.g., a purpose for the data) to the individual may be obtained. The resulting audio data 230—and/or other types of data that may include content relevant to discern purposes (e.g., topics) relevant to the individual for which the data is being collected and stored—may be used to identify topics relevant to the individual.

For example, audio data 230 may include an audio recording of a conversation between a patient and a medical provider in which the two people discuss diagnosis, treatment, etc. for a particular type of medical condition such as diabetes. The conversation may be analyzed to identify topics (e.g., medical conditions, medical tests, etc.) that are relevant to the patient.

In order to analyze audio data 230, transcription process 232 may be performed. During transcription process 232, audio data 230 may be transcribed to obtain text transcript 234. Transcription process 232 may be performed using an inference model (not shown), artificial intelligence model (AI model), natural language processing, and/or automated transcription modalities. For example, audio data 230 may be ingested by an inference model through which audio data 230 is analyzed and transcribed into a text format (e.g., text transcript 234).

Once text transcript 234 is obtained, topic analysis process 236 may be performed in order to obtain identified topics 216 and topic rankings 238. Identified topics 216 may, as noted above, indicate topics that are relevant to a user of the data management system, and topic rankings 238 may indicate a rank order of the topics indicated by the identified topics 216. The rank order may be with respect to relevancy of the topics to the user.

During topic analysis process 236, text transcript 234 may be analyzed to (i) identify topics relevant to a user, and (ii) relative importance of each of the topics to the user.

To identify topics relevant to the user, text transcript 234 may be analyzed via (i) automated textual analysis to identify frequency/number of occurrences of difference utterances (e.g., words, phrases, etc.) made during the conversation captured in audio data 230, (ii) inferencing using inference models, (iii) large language model based natural language processing, and/or other text analysis modalities. The resulting output of any of these analyzation techniques may include a list of (i) topics that arose during the conversation captured in audio data 230, (ii) frequencies/counts of the topics, (iii) levels of emphasis on the different topics made by the different participants in the conversation, (iv) participants in the conversation that brought up the topics during the conversation, (v) duration of time during the conversation each topic was the topic of the conversation, (vi) opinion polarity (e.g., positive, neutral, negative, etc.) of each topic identified in the data, and/or other information regarding the topics during the conversation.

Identified topics 216 may be established based on any of the aforementioned information obtained via analysis of text transcript 234. For example, identified topics 216 may include (i) all topics that met a minimum threshold of interest (e.g., brought up above a threshold number of times/met a duration of time requirement as the topic of conversation) during the conversation captured by audio data 230, (ii) a prescribed number of the topics that were of the highest interest, etc.

Topic rankings 238 may be established based on the level of interest in each of identified topics 216 identified based on the conversation captured by audio data 230. For example, topics rankings 238 may rank identified topics 216 based on the number of times, frequency of utterance, and/or other quantification regarding interest in each of identified topics 216.

For example, an AI model may analyze text data (e.g., text transcript 234) regarding medical diagnosis, treatment, etc. for an individual and identify features (e.g., certain group of text or words) related to diabetes (e.g., topic). As such, the AI model may establish the topic of diabetes to be relevant to the individual and assign a relevancy value to the topic of diabetes (e.g., topic rankings 238).

Identified topics 216 and topic rankings 238 may be stored in a data repository (not shown, may be data repository 222 shown in FIG. 2B) of data management system 102.

Over time, identified topics 216 and topics rankings 238 may be updated as new data is collected (e.g., audio data 230). Continuing with the above example, additional audio data that captures a conversation during which a new topic (e.g., such as a new medical condition) is discussed may be obtained and analyzed. Doing so may increase a relevancy value (e.g., topic ranking) for the new topic when compared to the topic of diabetes.

Once obtained, identified topics 216 and topic rankings 238 may be used to manage data stored in a data management system by processing search queries based on the association of different portions of the data with different topics to identify more relevant portions of the data with respect to an interest of a requestor.

Turning to FIG. 2D, a fourth data flow diagram illustrating data flows, data processing, and/or other operations that may be performed by the system of FIG. 1 in accordance with an embodiment is shown. The data flows, data processing, and/or other operations may be performed to manage data stored in a data management system by processing search queries.

To manage data, data management system (e.g., 102, FIG. 1) may process search queries based on the relevancy of the interest of the search queries. Processing search queries may include obtaining a search query (e.g., search query 240) from a requestor (e.g., data consumer 104) indicating a request for information regarding an interest of the requestor. Search query 240 may include one or more search terms associated with the interest of the requestor (e.g., data consumer 104). For example, data management system (e.g., 102, FIG. 1) may receive an indication that a search query has been obtained from a requestor (e.g., data consumer 104, FIG. 1).

After search query 240 is obtained, a search process (e.g., 242) may be performed to obtain a search result for the interest of the requestor. During search process 242, data (e.g., data portion 214) and topic classifications for the data (e.g., topic classifications 220) from data repository 222, as well as topic rankings 238 may be ingested. Once ingested, topic classifications (e.g., 220) associated with each data portion 214 and the search term(s) from search query 240 may be utilized by a search algorithm to identify portions of data relevant to the interest of the search query (e.g., 240). In addition to the topic classifications, the search algorithm may take into account different factors such as other types of metadata, information included in data portion, etc. The search algorithm may also take into account fewer factors (e.g., just the classifications themselves). The search algorithm may utilize any methodology such as, for example, similarity analysis between the search terms and the factors.

In an embodiment, the search algorithm weights the respective factors in the search. For example, the weights of the topic classifications may be weighted more heavily in search results then other factors such as the information included in each portion of data. Thus, a portion of data that does not include any information regarding the search term "bones" may still be identified as highly relevant if the portion of data is classified into the topic of "bones".

The search algorithm may return a ranking order defining the relevancy of the portions of the data with respect to the interest. For example, the portions of the data may be placed in a ranked order with the highest ranked order portion of the data being most relevant to the interest and the lowest ranked order portion of the data being least relevant to the interest. The ranking order may be used to select identifiers of portions of data to add to search result 244.

For example, search result 244 may be populated with identifiers for portions of data (e.g., stored in data repository 222) relevant with respect to the interest of the search query in an order based on the relevancy of the portions of the data with respect to the interest of the search query. For example, search result 244 may include a list of identifiers for portions of the data and a rank ordering of those identifiers based on the relevancy of the portions of the data with respect to the interest. In some instances, the search result (e.g., 244) may include a rank ordering of the portions of data starting with the highest ranked ordered portions of data (e.g., most relevant data with respect to the interest of the requestor).

Once obtained, search result 244 may be provided (e.g., via a wireless communication system, storing them in a predetermined location, etc.) to the requestor (e.g., data consumer 104) and/or other data processing systems). Search result 244 may be utilized by the requesting individual or entity in order to perform a task, make a decision, and/or perform any other action (e.g., a computer implemented service) that may rely on the search result obtained by search process 242. For example, search result 244 may include a list of portions of data relevant to the interest of "broken bones" for an individual useable by data consumer (e.g., such as a medical provider) to provide medical services (e.g., diagnosis, treatment, etc.) for the individual.

In addition, search result 244 may be provided to another data processing system for additional processing or further computation. For example, search result 244 may be used as input to train (and/or re-train) an inference model to perform computer-implemented services as specified by the inference model. For instance, an inference model may be trained using search result 244 (e.g., inputting identified portions of data related to "broken bones") to predict medical diagnosis, treatment, etc. for an individual.

Thus, using the data flows and processes shown in FIGS. 2A-2D, search queries may be automatically processed via discrimination of more relevant data from less relevant data. The discriminated more relevant data may be provided or otherwise utilized to manage processing search queries obtained from a requesting individual and/or entity.

As discussed above, the components of FIGS. 1-2D may perform various methods to manage operation of data processing systems. FIG. 3 illustrate a method that may be performed by the components of the system of FIGS. 1-2D. In the diagram discussed below and shown in FIG. 3, any of the operations may be repeated, performed in different orders, omitted, and/or performed in parallel with or in a partially overlapping in time manner with other operations.

Turning to FIG. 3, a flow diagram illustrating a method for managing data stored in a data management system in accordance with an embodiment is shown. The method may be performed, for example, by any of data source 100, data management system 102, data consumer 104, user device 106, and/or other components of the system shown in FIGS. 1-2D.

Prior to operation 300, a data management system may have obtained data for an individual and stored the data in a data repository within the data management system. The data may have been obtained through various processes such as generation, acquisition from external entity (e.g., medical provider), acquisition from the individual whose data is being stored, and/or by any other method. The data may include data relating to healthcare information for an individual (e.g., medical records) and/or topics discussed during conversations between a first person and a second person. The data may be classified and processed by the data management system based on topics (e.g., types of data) relevant to the individual. To classify and process the data, the data management system may identify topic and topic rankings for the identified topics for an individual.

At operation 300, a search query from a requestor may be obtained. The search query may indicate a request for information regarding an interest of the requestor. The search query may be obtained by (i) receiving the search query from a requesting individual and/or another entity via communication by a data processing system, (ii) reading the search query from storage, and/or (iii) any other methods. For example, a data management system or another entity may manage a portal (e.g., a website) through which the search query may be submitted by a requestor. The requestor (e.g., requesting individual and/or entity) may provide the search query requesting information regarding an interest of the requestor using a personal electronic device, and/or other type of data processing system.

At operation 302, a search process may be performed using the data, topic classifications for the data, topic rankings for the topic classifications, to obtain a search result for the interest, and the topic classifications associate different portions of the data with different topics that are based on at least one conversation between two people.

Performing the search process may include ingesting (i) data (e.g., stored in data repository 222 shown in FIG. 2B), (ii) topic classifications for the data (e.g., topic classifications 220 shown in FIG. 2B), (iii) topic rankings for the topic classifications (e.g., topic rankings 238), and/or any other information necessary to perform the search process.

For example, an operating system may perform a search process by ingesting the data, topic classifications for the data, and topic rankings for the topic classifications (e.g., stored in a data management system) in a search algorithm and obtain an output identifying portions of data more relevant to the search query (e.g., search result 244).

The topic classifications for the data may, as discussed above, be based at least in part on the topics discussed during the conversation between the two people. The topic classifications may include an enumeration of each unique topic of topics discussed during the conversation between two people. For example, an audio recording may include a conversation between patient and a medical provider discussing a patient's diabetes diagnosis, treatment, etc. In this example, diabetes may be identified as the topic classification in which some portion of data obtained from a data source (e.g., medical provider system) may be associated.

The topic rankings may be based, at least in part, on instances of the topics discussed during a conversation between the two people. For example, a counter of the utterances for the topics, duration of conversation dedicated to each topic, and/or other quantifications may be derived from the conversation. The topic rankings may be based on these quantifications (e.g., more frequently uttered topics may be ranked more highly than less frequently uttered topics).

The portions of data (e.g., identifiers for the portions of data) may be added to a search result list. The search result may include a list of at least a portion of the portions of the data and a rank ordering of elements of the list. The rank ordering may define the relevancy of the portions of the data with respect to the interest. For example, the search result may indicate an ordering of relevancy of the portions of the data with respect to the interest of the requestor (e.g., indicated via the search query).

At operation 304, the search result may be used to service the search query. Using the search result to service the search query may be performed by (i) providing the search result to the requesting individual or entity via communication by a data processing system (e.g., in form of a message, etc.), (ii) transmitting the search result to another entity responsible for providing the search result to the requesting individual or entity that the search result is available in the database, (iii) by storing the search result in a database and notifying the requesting individual or entity that the search result is available in the database, (iv) providing the search result to another data processing system (e.g., inference model) and obtaining an output for the requestor based on the search result, and/or any other methods.

The method may end following operation 304.

Using the methods illustrated in FIG. 3, embodiments disclosed herein may facilitate data management by processing search queries for data stored in a data management system. Data management may include processing search queries by performing a search process based on the relevancy of the data for an individual.

Figure 4:
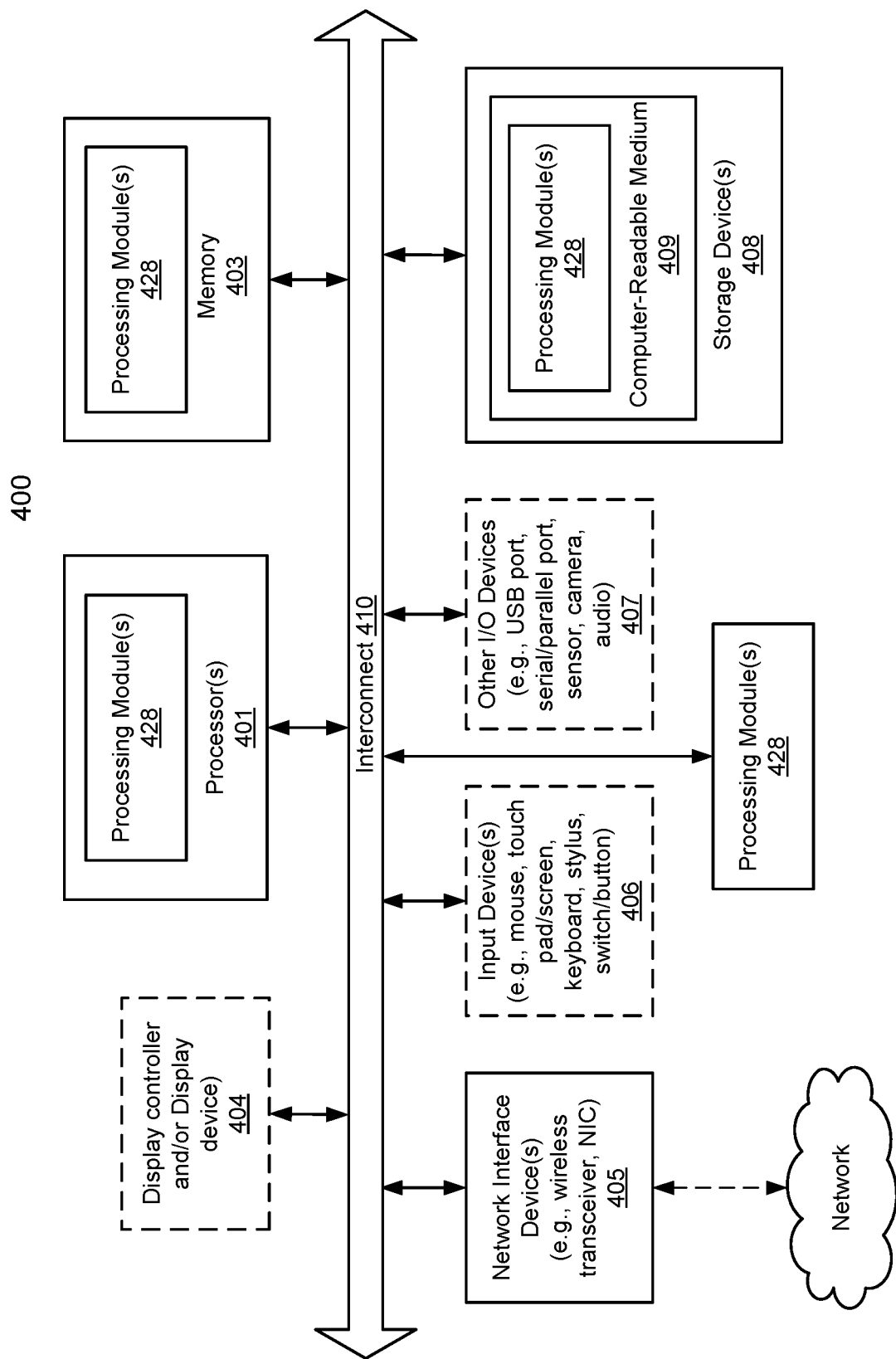
FIG. 4 shows a block diagram illustrating a data processing system in accordance with an embodiment.

Any of the components illustrated in FIGS. 1-2D may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing data stored in a storage of a data management system by processing search queries, the method comprising:

obtaining a search query from a requestor, the search query indicating a request for information regarding an interest of the requestor, the information being requested by the requestor is a portion of the data stored in the data management system, and the data being related to only one person;

performing a search process using the data, topic classifications for the data stored as metadata in the data, and topic rankings for the topic classifications to obtain a search result for the interest, the topic classifications associate different portions of the data with different topics identified within at least one conversation between two people comprising the one person so that the topic classifications are customized to the one person; and using the search result to service the search query, wherein prior to the data being stored in the data management system, the method further comprises:

generating a first set of topics for the data using a classification model hosted by the data management system, the classification model ingesting portions of the data and outputting classifications for each of the portions of the data to obtain the first set of topics;

identifying the different topics in the at least one conversation between the two people to generate a second set of topics for the data; and obtaining the topic classifications using the first set of topics and the second set of topics by at least:

deleting from the first set of topics any topics making up the first set of topics that are not included in the second set of topics while the second set of topics remains unchanged; and using, after the deleting, any remaining topics within the first set of topics that have not been deleted as the topic classifications used for performing the search process.

2. The method of claim 1, wherein the search result indicates an ordering of relevancy of portions of the data with respect to the interest.

3. The method of claim 2, wherein the search result comprises a list comprising at least a portion of the portions of the data and a rank ordering of elements of the list, the rank ordering defining the relevancy of the portions of the data with respect to the interest.

4. The method of claim 1, wherein the topic rankings are based at least in part on an audio transcript, the audio transcript being based on an audio file, the audio file comprising audio data based on the at least one conversation between the two people.

5. The method of claim 4, wherein the two people comprise a first person for which the data is stored by the data management system, and a second person which provides at least one service to the first person.

6. The method of claim 5, wherein the at least one service is a medical service, and the at least one conversation between the two people being part of the at least one service and comprises medical data of the first person.

7. The method of claim 4, wherein the topic rankings are based at least a frequency of each of the topic classifications as the topic classifications are discussed in words and phrases used during the at least one conversation between the two people.

8. The method of claim 7, wherein the topic rankings specify a rank ordering of the topic classifications.

9. The method of claim 8, wherein the topic classifications are based at least in part on the topics discussed during the at least one conversation between the two people.

10. The method of claim 9, wherein the topic classifications comprise an enumeration of each unique topic of the topics discussed during the at least one conversation between the two people.

11. The method of claim 1, wherein identifying the different topics comprises:

identifying spoken topics that arose during the at least one conversation;

identifying counts of instances of the spoken topics that arose during the at least one conversation;

identifying levels of emphasis on the spoken topics made by participants in the at least one conversation;

associating the participants with portions of the spoken topics that were brought up by the respective participants; and identifying durations of time during the at least one conversation where each of the spoken topics were a focus topic of the at least one conversation.

12. The method of claim 11, wherein identifying the different topics further comprises:

identifying opinion polarities of each of the spoken topics by the participants.

13. A non-transitory machine-readable medium having instructions stored therein, which when executed by a processor, cause the processor to perform operations for managing data stored in a data management system by processing search queries, the operations comprising:

obtaining a search query from a requestor, the search query indicating a request for information regarding an interest of the requestor, the information being requested by the requestor is a portion of the data stored in the data management system, and the data being related to only one person;

performing a search process using the data, topic classifications for the data stored as metadata in the data, and topic rankings for the topic classifications to obtain a search result for the interest, the topic classifications associate different portions of the data with different topics identified within at least one conversation between two people comprising the one person so that the topic classifications are customized to the one person; and using the search result to service the search query, wherein prior to the data being stored in the data management system, the operations further comprising:

generating a first set of topics for the data using a classification model hosted by the data management system, the classification model ingesting portions of the data and outputting classifications for each of the portions of the data to obtain the first set of topics;

identifying the different topics in the at least one conversation between the two people to generate a second set of topics for the data; and obtaining the topic classifications using the first set of topics and the second set of topics by at least:

deleting from the first set of topics any topics making up the first set of topics that are not included in the second set of topics while the second set of topics remains unchanged; and using, after the deleting, any remaining topics within the first set of topics that have not been deleted as the topic classifications used for performing the search process.

14. The non-transitory machine-readable medium of claim 13, wherein the search result indicates an ordering of relevancy of portions of the data with respect to the interest.

15. The non-transitory machine-readable medium of claim 14, wherein the search result comprises a list comprising at least a portion of the portions of the data and a rank ordering of elements of the list, the rank ordering defining the relevancy of the portions of the data with respect to the interest.

16. The non-transitory machine-readable medium of claim 13, wherein the topic rankings are based at least in part on an audio transcript, the audio transcript being based on an audio file, the audio file comprising audio data based on the at least one conversation between the two people.

17. The non-transitory machine-readable medium of claim 16, wherein the two people comprise a first person for which the data is stored by the data management system, and a second person which provides at least one service to the first person.

18. A data processing system, comprising:
- a processor; and
- a memory coupled to the processor to store instructions, which when executed by the processor, cause the processor to perform operations for managing data stored in a data management system by processing search queries, the operations comprising:
  - obtaining a search query from a requestor, the search query indicating a request for information regarding an interest of the requestor, the information being requested by the requestor is a portion of the data stored in the data management system, and the data being related to only one person;
  - performing a search process using the data, topic classifications for the data stored as metadata in the data, and topic rankings for the topic classifications to obtain a search result for the interest, the topic classifications associate different portions of the data with different topics identified within at least one conversation between two people comprising the one person so that the topic classifications are customized to the one person; and
  - using the search result to service the search query,
  - wherein prior to the data being stored in the data management system, the operations further comprising:
    - generating a first set of topics for the data using a classification model hosted by the data management system, the classification model ingesting portions of the data and outputting classifications for each of the portions of the data to obtain the first set of topics;
    - identifying the different topics in the at least one conversation between the two people to generate a second set of topics for the data; and
    - obtaining the topic classifications using the first set of topics and the second set of topics by at least:
      - deleting from the first set of topics any topics making up the first set of topics that are not included in the second set of topics while the second set of topics remains unchanged; and
      - using, after the deleting, any remaining topics within the first set of topics that have not been deleted as the topic classifications used for performing the search process.

19. The data processing system of claim 18, wherein the search result indicates an ordering of relevancy of portions of the data with respect to the interest.

20. The data processing system of claim 19, wherein the search result comprises a list comprising at least a portion of the portions of the data and a rank ordering of elements of the list, the rank ordering defining the relevancy of the portions of the data with respect to the interest.

* * * * *